United States Patent

Patel et al.

Patent Number: 5,111,094
Date of Patent: May 5, 1992

[54] PERMANENT MAGNET ROTOR HAVING MAGNET RETENTION APPARATUS

[75] Inventors: Balkrishna R. Patel, Troy; Andrew L. Bartos, Clarkston, both of Mich.

[73] Assignee: General Motors Corporation, Detroit, Mich.

[21] Appl. No.: 754,091

[22] Filed: Sep. 3, 1991

[51] Int. Cl.⁵ ............... H02K 21/12; H02K 15/14
[52] U.S. Cl. ................... 310/156; 310/42; 310/262; 29/598
[58] Field of Search .......... 310/42, 91, 156, 262, 310/263, 266, 271; 29/598, 596

[56] References Cited

U.S. PATENT DOCUMENTS

| | | | |
|---|---|---|---|
| Re. 31,950 | 7/1985 | Binns | 310/156 |
| 4,472,650 | 9/1984 | Advolotkin et al. | 310/156 |
| 4,543,506 | 9/1985 | Kawada et al. | 310/156 |
| 4,594,525 | 6/1986 | Stokes | 310/156 |
| 4,617,726 | 10/1986 | Denk | 29/598 |
| 4,625,135 | 11/1986 | Kasabian | 310/156 |
| 4,633,113 | 12/1986 | Patel | 310/156 |
| 4,639,627 | 1/1987 | Takekoshi et al. | 310/156 |
| 4,678,954 | 7/1987 | Takeda et al. | 310/156 |
| 4,757,603 | 7/1988 | Stokes | 29/598 |
| 4,864,175 | 9/1989 | Rossi | 310/156 |
| 4,879,485 | 11/1989 | Tassinario | 310/156 |
| 4,930,201 | 6/1990 | Brown | 29/598 |
| 4,953,284 | 9/1990 | Hammer et al. | 29/596 |
| 4,954,736 | 9/1990 | Kawamoto et al. | 310/156 |
| 4,973,872 | 11/1990 | Dohogne | 310/156 |

Primary Examiner—Steven L. Stephan
Assistant Examiner—Dennis R. Haszko
Attorney, Agent, or Firm—Mark A. Navarre

[57] ABSTRACT

A permanent magnet rotor for a brushless machine includes retainer rings to provide additional magnet retention when the magnets are stacked lengthwise along the rotor. The retainer ring seats into a groove formed on the outer surfaces of two magnets where they abut. Furthermore, end rings seated into an undercut area of the outer surface of the magnet edge at the ends of the rotor provide additional magnet retention.

6 Claims, 2 Drawing Sheets

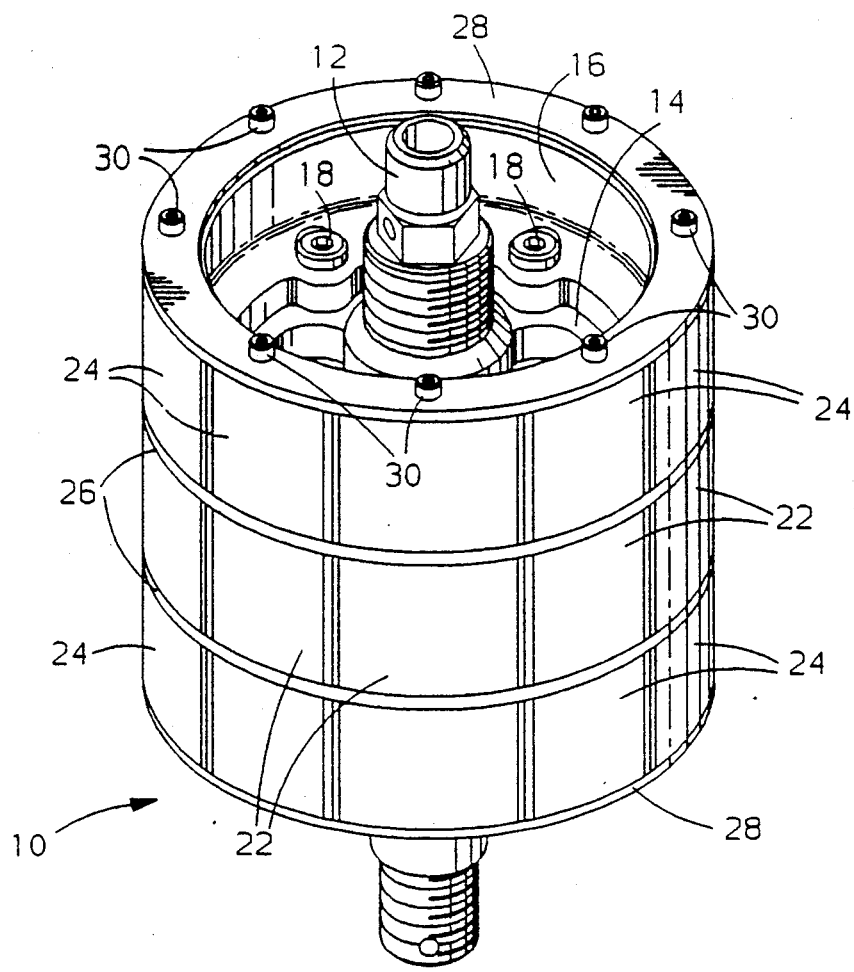
FIG. 1
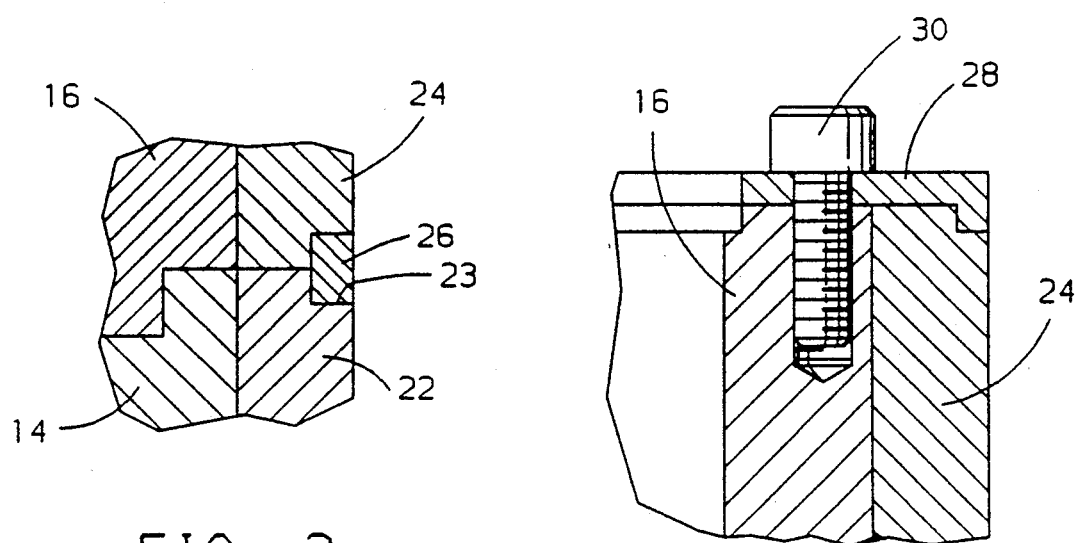
FIG. 3
FIG. 4

PERMANENT MAGNET ROTOR HAVING MAGNET RETENTION APPARATUS

The present invention relates to a permanent magnet rotor for an electric motor where retaining rings and end rings encircle the rotor, and aid in maintaining the magnets securely to the rotor.

BACKGROUND OF THE INVENTION

In a motor with a permanent magnet rotor, the operating speed of the motor is partially limited by the difficulties of retaining the magnets to the rotor caused by the centrifugal force generated at high rotor speeds. Generally, when a rotor and its magnets are assembled, the magnets are glued to the rotor, this often being the only means of attaching the magnets to the rotor. At high operating speeds, the centrifugal force generated upon the magnets may overcome the glue bond holding the magnets to the rotor, and damage to the motor may result. If magnets can be more securely retained to the rotor, the operating speed of the motor can consequently be increased as there is less concern regarding the magnets breaking away from the rotor. On rotors where magnets are the same length as the rotor length, rings fastened to the magnets at the ends of the rotor provide a sufficient, additional means of retention.

In addition to retention issues caused by motors operating at high speeds, additional design considerations arise due to the development of high energy product magnets. These magnets may only be manufactured up to a maximum length which is shorter than the required magnet length for some rotors, and methods of magnetizing these magnets place a practical limitation upon their length. Motor designers can compensate for this limitation by stacking shorter magnets lengthwise along the rotor, effectively creating a longer magnet having a more powerful field. Consequently, magnet retention systems solely using end rings as retainers are ineffective when applied to stacked-magnet rotors.

Existing methods of retaining permanent magnets to a stacked-magnet rotor generally include first gluing the magnets to the rotor and, second, employing some additional method of retention, but these methods are either time consuming or degrade motor performance. One such method is a fiber-glass banding process where the rotor and attached magnets are wrapped with a fiberglass band, then covered with an epoxy coating around the outside of the rotor assembly. This method retains the magnets securely in place, but is expensive, time consuming, and requires additional, accurate tooling. A second method is to surround the rotor with a non-magnetic stainless steel sleeve that fits tightly to the outside of the rotor assembly. However, a stainless steel sleeve introduces additional iron losses at high speeds and requires an increased airgap, thereby lowering the output torque of the motor.

SUMMARY OF THE PRESENT INVENTION

The present invention is directed toward an improved permanent magnet rotor which retains permanent magnets of a stacked magnet rotor. The rotor is comprised of lengthwise segments, one of which is a primary segment and the others of which are secondary segments that attach to the primary segment. Fastened to the rotor segments are magnets which are of substantially the same length as the rotor segments. The secondary rotor segments with magnets are then attached in coaxial abutting relationship to the primary rotor segment with magnets.

Where magnets of one segment abut magnets of another segment, the magnets are undercut along their edges to form a groove where the segments meet. Into this groove, before the segments are put together, a retaining ring is set, and the segments are attached. In this way, the retaining rings retain the magnets of the adjacent segments. In addition to the retaining rings, the magnet edges at the ends of the rotor are ground to form undercuts. End rings are then attached to the segments at the ends of the rotor. The end rings include a lip which overlaps the undercut of the magnet edges which, in conjunction with retaining rings, retains the magnets located at the ends of the rotor.

The segmented rotor apparatus is particularly suitable to applications using more powerful, high energy product magnets. Such magnet lengths are limited by manufacturing considerations and by magnetizing considerations. The segmented rotor is responsive to both considerations because the shorter, more powerful magnets may be stacked to produce a longer field, and the segments are of a length that facilitates their magnetization. By addressing these considerations, high energy product magnets are more easily adaptable to a variety of applications.

BRIEF DESCRIPTION OF THE DRAWINGS

FIG. 1 is a perspective drawing of the rotor assembly.

FIG. 3 is an enlarged sectional view of the retaining ring area of the rotor assembly in FIG. 2.

FIG. 4 is an enlarged sectional view of the end ring area of the rotor assembly in FIG. 2.

DETAILED DESCRIPTION OF THE INVENTION

Figure 2:
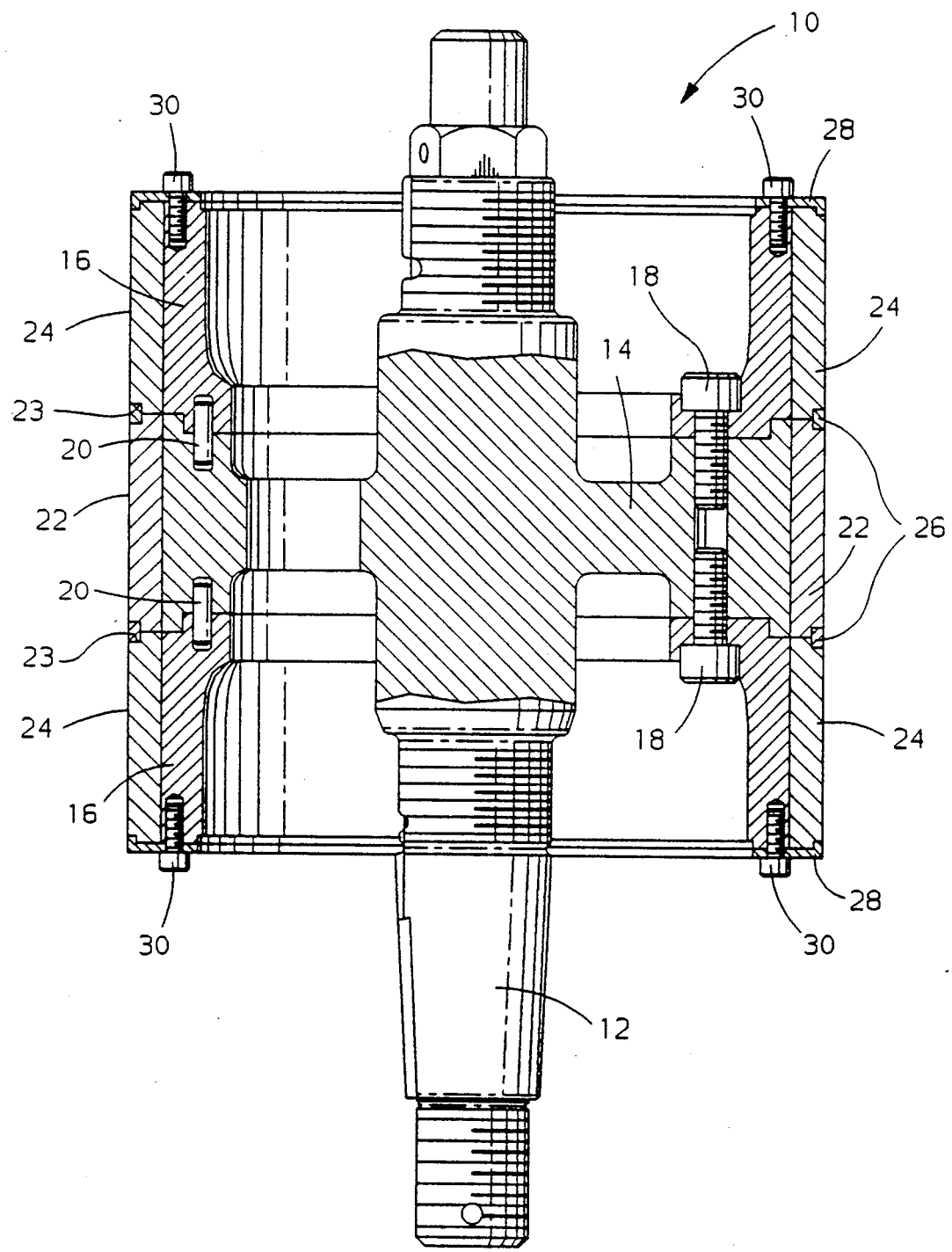
FIG. 2 is a drawing of an axial section of the rotor assembly, including attached segments, retainer rings, and end rings.

Referring to FIGS. 1-4, rotor assembly 10 which is used in a brushless motor application is shown where magnets are retained by retainer rings and end rings in addition to being fastened to the rotor by any of a number of gluing processes. The rotor includes attached segments, with magnets fixed to these segments, where the segments are then attached lengthwise in coaxial abutting relationship to form rotor assembly 10.

One segment of the rotor assembly, primary segment 14, includes a finished rotor shaft 12. Secondary segments 16 attach to both sides of primary segment 14 as shown. Note that it is possible to use one or more secondary segments. Secondary segments 16 attach to primary segment 14 using fastener means as shown in FIGS. 1 and 2 where socket head cap screws 18 hold the segments together. The secondary segments may be aligned with the primary segment using dowel pins 20, for example, or some other alignment means.

Magnets are mounted to the outside of the rotor segments, including primary magnets 22, mounted to primary segment 14 and secondary magnets 24, mounted to secondary segments 16. The magnets 22, 24 are attached to the rotor segments 14, 16 using a gluing process or some other appropriate fastening means. In the vicinity where the primary segment 14 abuts a secondary segment 16, the outer surfaces of both the primary magnets 22 and secondary magnets 24 are ground at the edges to form a groove 23 around the rotor when the primary and secondary segments abut, see FIG. 3. Before the rotor segments with magnets are attached, retaining ring 26, whose inside diameter is substantially the same as the inner diameter of the groove, is seated between the segments. Once the segments are attached, retaining ring 26 encircles both the the primary and secondary magnets, keeping the magnets in place even if centrifugal force due to high speed operation exceeds the glue-bond strength. When seated into the groove, the retaining ring lies within the circumferential envelope of the rotor, preventing the requirement of an increased airgap between the rotor and the stator.

Because it is desirable to provide some form of magnet retention to the ends of the rotor assembly to insure uniform retention, end rings 28 attach to the secondary rotor segments 16 at the ends of the rotor 10. An undercut is ground into the outer surfaces at the edges of the magnets at the ends of rotor assembly 10, and the end rings 28 are seated to overlap this undercut and provide magnet retention at the rotor ends. FIG. 4 shows an enlarged detail of the area where the end rings 28 overlap the undercut. Socket head screws 30 fasten end rings 28 to the secondary rotor segments 16. As with retaining ring 26, end rings 28 lie within the circumferential envelope of the rotor for the same reason of maintaining a minimal airgap.

The above described apparatus offers an additional advantage that magnets shorter than the rotor length can be more easily stacked lengthwise, forming a longer a magnet with a length equal to that of the rotor length. More particularly, this apparatus is especially suited for the higher energy product magnets whose maximum length is constrained by manufacturing considerations and magnetizing considerations. The material properties of high energy product magnets place a limit on the length of magnet which may be produced. Furthermore, the length of high energy product magnets is also constrained by the length of magnet that may be magnetized. Accordingly, it is sometimes necessary to stack more than one such magnet along the length of the rotor to obtain the desired magnetic field. This apparatus readily adapts to using high energy product magnets as the length of each segment may be related to the allowable length of the magnets used. A further advantage realized by this apparatus, regardless of whether using high energy product magnets, is that the described apparatus requires neither an increased airgap nor complex time consuming assembly as is required in other rotor apparatuses.

A segmented rotor offers the additional benefit of not having to magnetize the magnets until immediately before final assembly, after all manufacturing operations have occurred. Because the rotor is segmented and the secondary magnets have hollow centers, the magnets of the secondary segments need not be magnetized until immediately before final assembly to the primary segment 14. Furthermore, the primary rotor segment 14 can be designed so that the rotor shaft and the ring to which the magnets attach may be mechanically fastened together, as compared to a one piece primary rotor segment 14. In such a case, the primary rotor segment magnets also need not be magnetized until immediately before final assembly of the rotor. By not magnetizing the magnets until final assembly, manufacturing processes such as transportation and grinding are made easier. This gives the added benefit of eliminating the need for expensive tooling required to glue the magnetized magnets to the rotor and to grind magnetized magnets.

While this invention has been described in reference to the illustrated embodiment, it will be understood that the scope of the present invention is not limited thereto. Various modifications to the illustrated embodiment may occur to those skilled in the art, and it should be understood that systems incorporating such modifications may also fall within the scope of this invention, which is defined by the appended claims.

The embodiments of the invention in which an exclusive property or privilege is claimed are defined as follows:

1. A permanent magnet rotor for an electric motor comprising:

a rotor shaft;

segmented rotor core means including a primary core segment secured to said rotor shaft and at least one secondary core segment secured to said primary segment in coaxial abutting relationship therewith;

primary and secondary permanent magnets secured to outer circumferential surfaces of said primary and secondary segments to define juxtaposed magnet surfaces where said primary and secondary magnets abut, the juxtaposed surfaces being undercut to form a groove which encircles the primary and secondary magnets at said juxtaposed magnet surfaces;

a retaining ring seated into said groove, said ring retaining the magnets securely to the rotor, overcoming centrifugal force generated by rotation of the rotor; and end rings attached to axial ends of the rotor, said end rings retaining the magnets securely to rotor, overcoming the centrifugal force generated by rotation of the rotor.

2. The apparatus set forth in claim 1, wherein said retainer rings are seated into said groove so as to not project radially beyond the juxtaposed magnet surfaces thereby eliminating a possible interference condition with other motor components.

3. The apparatus set forth in claim 1, wherein said end rings are attached so as to not project radially beyond juxtaposed magnet surfaces thereby eliminating a possible interference condition with other motor components.

4. A permanent magnet rotor for an electric motor comprising:

a rotor shaft;

one primary core segment secured to said rotor shaft;

first and second secondary core segments secured to opposite ends of said primary core segment in coaxial abutting relationship therewith;

primary and secondary permanent magnets secured to outer circumferential surfaces of said primary and secondary segments to define juxtaposed magnet surfaces where said primary and secondary magnets abut, the juxtaposed surfaces being undercut to form a first groove where said primary and first secondary segments abut, and a second groove where said primary and second secondary segments abut, the grooves encircling the primary and secondary magnets at said juxtaposed magnet surfaces;

a first retaining ring seated into said first groove for retaining the primary and first secondary magnets securely to the rotor, overcoming centrifugal force generated by rotation of the rotor;

a second retaining ring seated into said second groove for retaining the primary and second secondary magnets securely to the rotor, overcoming centrifugal force generated by rotation of the rotor;

a first end ring attached to an axial end of the rotor at the first secondary segment, the first end ring retaining the first secondary magnets securely to rotor, overcoming the centrifugal force generated by rotation of the rotor; and a second end ring attached to an axial end of the rotor at the second secondary segment, the second end ring retaining the second secondary magnets securely to rotor, overcoming the centrifugal force generated by rotation of the rotor.

5. The apparatus set forth in claim 4, wherein said retainer rings are seated into said grooves so as to not project radially beyond the juxtaposed magnet surfaces thereby eliminating a possible interference condition with other motor components.

6. The apparatus set forth in claim 4, wherein said end rings are attached so as to not project radially beyond juxtaposed magnet surfaces thereby eliminating a possible interference condition with other motor components.

* * * * *